(12) United States Patent
Seo

(10) Patent No.: US 11,602,137 B2
(45) Date of Patent: Mar. 14, 2023

(54) NET ASSEMBLY USED FOR PURSE SEINE FISHERY

(71) Applicant: KTI CORPORATION, Busan (KR)

(72) Inventor: Il Tai Seo, Busan (KR)

(73) Assignee: KTI CORPORATION, Busan (KR)

( * ) Notice: Subject to any disclaimer, the term of this patent is extended or adjusted under 35 U.S.C. 154(b) by 387 days.

(21) Appl. No.: 16/771,820

(22) PCT Filed: May 28, 2018

(86) PCT No.: PCT/KR2018/006010
§ 371 (c)(1),
(2) Date: Jun. 11, 2020

(87) PCT Pub. No.: WO2019/132136
PCT Pub. Date: Jul. 4, 2019

(65) Prior Publication Data
US 2021/0169058 A1 Jun. 10, 2021

(30) Foreign Application Priority Data
Dec. 27, 2017 (KR) .......................... 10-2017-0180485

(51) Int. Cl.
*A01K 73/12* (2006.01)
*A01K 75/00* (2006.01)
(Continued)

(52) U.S. Cl.
CPC .............. *A01K 73/12* (2013.01); *A01K 71/00* (2013.01); *A01K 75/00* (2013.01); *A01K 75/005* (2022.02); *A01K 75/04* (2013.01); *A01K 75/06* (2013.01)

(58) Field of Classification Search
CPC ........ A01K 71/00; A01K 73/00; A01K 73/06; A01K 73/12; A01K 74/00; A01K 75/00;
(Continued)

(56) References Cited

U.S. PATENT DOCUMENTS 1,390,006 A * 9/1921 Akre ....................... A01K 73/12
43/8
1,980,452 A * 11/1934 Reubens ................ A01K 73/12
43/4.5
(Continued)

FOREIGN PATENT DOCUMENTS

CN 101718005 A 6/2010
DE 822590 C * 11/1951
(Continued)

OTHER PUBLICATIONS

Translation of JP H06-303877 (Year: 1994).*
(Continued)

*Primary Examiner* — Darren W Ark
(74) *Attorney, Agent, or Firm* — Dilworth IP, LLC

(57) ABSTRACT

A net assembly used for purse seine fishery, which is mounted on a first vessel, dropped into seawater from the first vessel, and towed by a second vessel to surround and pull fish to capture fish. The net assembly includes a plurality of floats floating on a surface of seawater to provide buoyancy to the net assembly, and coupled to one another in a spaced manner in a lengthwise direction of the net assembly; a net combination of a plurality of nets disposed under the floats in an inter-coupled state, and sunken and deployed from the surface of seawater to surround and capture fish; a weight body extending along a lower end of the net combination to provide a sinking force by means of gravity to sink the net combination; and a purse wire extending along the net combination while being spaced apart from the weight body in a downward direction, and tightened by the first vessel to allow the net assembly to form a closed space below the surface of seawater.

4 Claims, 2 Drawing Sheets

(51) Int. Cl.
*A01K 71/00* (2006.01)
*A01K 75/04* (2006.01)
*A01K 75/06* (2006.01)

(58) Field of Classification Search
CPC ...... A01K 75/005; A01K 75/04; A01K 75/06; A01K 79/00
USPC .................................. 43/7, 8, 9.95, 9.8, 14
See application file for complete search history.

(56) References Cited

U.S. PATENT DOCUMENTS

| | | | | |
|---|---|---|---|---|
| 2,310,702 A * | 2/1943 | Ljubetich | ............... | A01K 73/12 43/14 |
| 2,673,415 A * | 3/1954 | Strom | ................... | A01K 73/12 43/4.5 |
| 3,064,384 A * | 11/1962 | Lewis | ................... | A01K 73/12 43/14 |
| 3,112,575 A * | 12/1963 | Lewis | ...................... | B66D 1/36 43/8 |
| 3,687,418 A * | 8/1972 | Halvorsen | .............. | B66D 1/741 414/142.8 |
| 3,789,532 A * | 2/1974 | Ferguson | ............... | A01K 73/12 43/14 |
| 3,808,725 A * | 5/1974 | Matsumoto | ........... | A01K 75/00 43/7 |
| 3,849,927 A * | 11/1974 | Gonsalves | ............ | A01K 75/00 43/106 |
| 3,938,274 A * | 2/1976 | Seymour | ................ | A01K 73/12 43/4.5 |
| 4,006,549 A * | 2/1977 | Seabrooke | ............ | A01K 73/12 43/106 |
| 4,125,955 A * | 11/1978 | Puretic | ................... | A01K 73/12 43/8 |
| 4,174,582 A * | 11/1979 | McKnight | .............. | A01K 73/12 43/106 |
| 4,175,347 A * | 11/1979 | Puretic | ................... | A01K 73/12 43/6.5 |
| 4,193,219 A * | 3/1980 | Pogue | ..................... | A01K 73/12 43/106 |
| 4,365,575 A * | 12/1982 | Cicero | ................... | A01K 73/12 43/8 |
| 4,442,786 A * | 4/1984 | Conners | .................. | B63B 35/14 43/14 |
| 4,449,315 A * | 5/1984 | Puretic | ................... | A01K 73/12 43/8 |
| 4,986,021 A * | 1/1991 | Thomas | .................. | A01K 73/12 43/104 |
| 5,287,645 A * | 2/1994 | Gois | ....................... | A01K 73/12 24/579.11 |
| 5,453,190 A * | 9/1995 | Martin, Sr. | ............ | A01K 75/00 114/244 |
| 5,505,013 A * | 4/1996 | Gois | ....................... | F16B 45/02 43/14 |
| 5,647,160 A * | 7/1997 | Anderson | .............. | A01K 73/12 43/4.5 |
| 5,778,591 A * | 7/1998 | Oschman | ............... | A01K 79/02 43/17.1 |
| 6,073,382 A * | 6/2000 | Willener | ................ | A01K 79/00 210/776 |
| 6,453,596 B1 * | 9/2002 | Marco | ..................... | A22B 3/06 43/4.5 |
| 7,624,483 B1 * | 12/2009 | Jang | ........................ | F16B 45/02 24/599.1 |
| 7,743,475 B2 * | 6/2010 | Jang | ........................ | A01K 73/12 43/14 |
| 8,141,228 B2 * | 3/2012 | Gois, Sr. | ................. | A01K 75/00 43/14 |
| 8,210,125 B2 * | 7/2012 | Vidal Rudloff | ........ | A01K 61/60 119/223 |
| 8,359,719 B2 * | 1/2013 | Jang | ........................ | A01K 75/00 43/14 |
| 2006/0096548 A1 | 5/2006 | Ytterland et al. | | |
| 2010/0088945 A1 * | 4/2010 | Gois | ....................... | F16B 45/02 43/14 |
| 2010/0242336 A1 * | 9/2010 | Gunnarsson | ............. | D04G 1/00 87/13 |
| 2014/0315030 A1 * | 10/2014 | Niimoto | .................. | B63B 59/04 524/92 |
| 2019/0017203 A1 * | 1/2019 | Andoh | .................... | D04H 3/045 |
| 2022/0010469 A1 * | 1/2022 | Willard | .................... | D04G 3/00 |
| 2022/0022436 A1 * | 1/2022 | Yu | .......................... | A01K 73/12 |
| 2022/0110302 A1 * | 4/2022 | Dominguez | ........... | A01K 73/00 |

FOREIGN PATENT DOCUMENTS

| | | | | |
|---|---|---|---|---|
| JP | 06303877 A | | 11/1994 | |
| JP | 2000-004716 A | | 1/2000 | |
| JP | 2008031572 A | * | 2/2008 | |
| JP | 2019088266 A | * | 6/2019 | ............ A01K 75/00 |
| JP | 2021166547 A | * | 10/2021 | |
| KR | 20040073018 A | * | 8/2004 | |
| KR | 10-1046863 B1 | | 7/2011 | |
| KR | 10-2013-0013915 A | | 2/2013 | |
| KR | 101459009 B1 | * | 11/2014 | |
| KR | 102160827 B1 | * | 9/2020 | |

OTHER PUBLICATIONS

International Search Report in related Application No. PCT/KR2018/006010; dated Sep. 20, 2018; 4 pages.

Written Opinion in related Application No. PCT/KR2018/006010; dated Sep. 20, 2018; 4 pages.

Chinese Office Action in related CN Application No. 201880083440.4; dated Jun. 11, 2021; 21 pages.

* cited by examiner

[FIGURE 1]
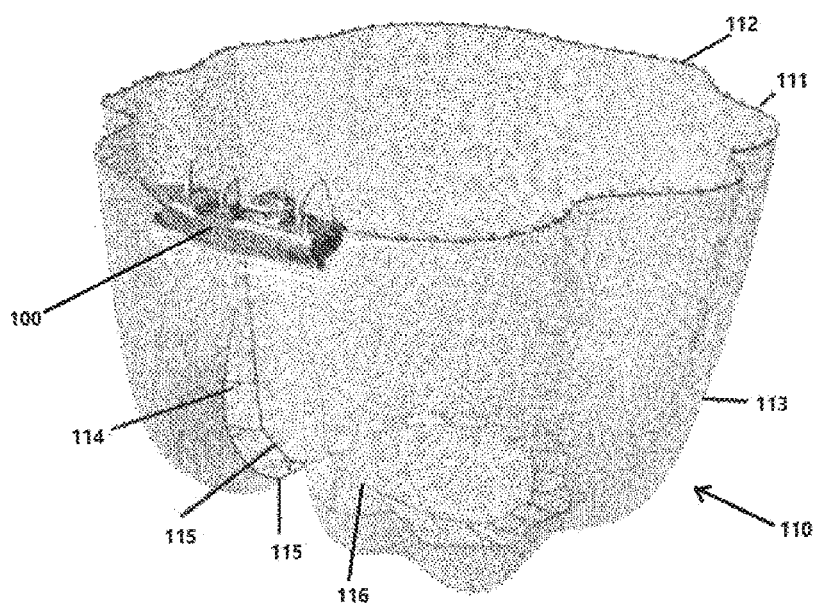
PRIOR ART

[FIGURE 2]
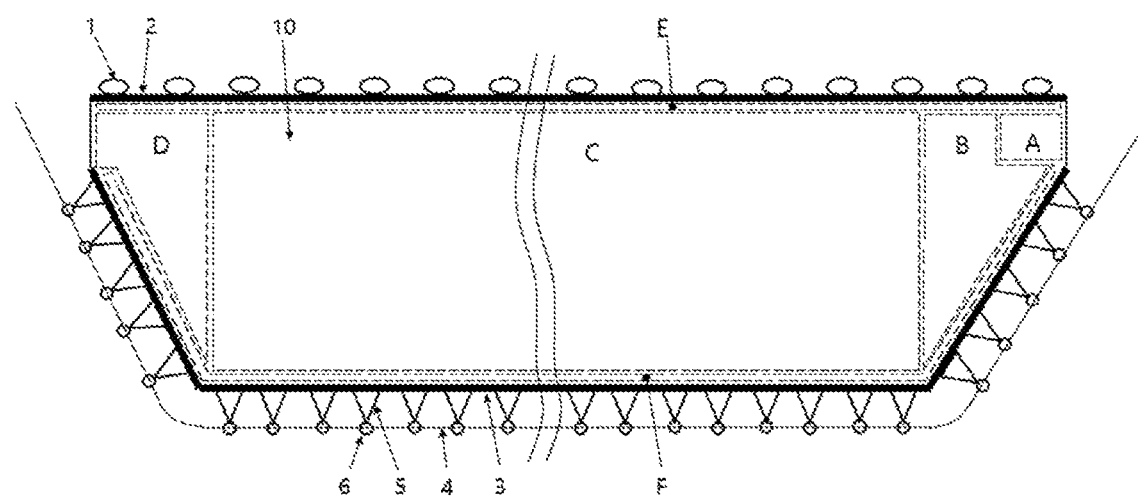

NET ASSEMBLY USED FOR PURSE SEINE FISHERY

TECHNICAL FIELD

The disclosure relates to a net assembly used for purse seine fishery, and more particularly, to a net assembly used for purse seine fishery, in which a long net encircles and surrounds a school of fish and then a purse wire disposed at the lower end of the net assembly is tightened and hauled to capture fish.

BACKGROUND ART

Purse seine fishery refers to fishery in which a long net encircles and surrounds a school of fish to narrow a surrounding range, a purse wire extending along the lower end of the net is tightened to prevent fish from escaping below the net, and then the net is hauled to capture fish.

Japanese Patent Laid-Open Publication No. Heisei 6-303877 discloses a method of purse seine fishery.

Purse seine fishery is a fishery system mainly used for capturing fish drifting near the surface of seawater. Since a net used in purse seine fishery should extend from the surface of seawater to a depth below a level at which fish drift, the net should be disposed in a form extending vertically downward from the surface of seawater.

Thus, the net used in purse seine fishery forms an assembly in which, in addition to the net, corks or floats providing buoyancy to allow the upper end of the net to be placed on the surface of seawater are coupled to the upper end of the net, a weight body is coupled to the lower end of the net to allow the lower end of the net to sink below the surface of seawater, and a purse wire to tighten the lower end of the net is coupled to the net below the weight body.

FIG. 1 illustrates a conventional net assembly which is used in purse seine fishery.

In purse seine fishery, after a net assembly is mounted on a first vessel, the net assembly is dropped into seawater first from one end thereof in a lengthwise direction, a second vessel tows the one lengthwise end first dropped and deploys the net assembly in the lengthwise direction to encircle a school of fish to capture, and then, the one end of the net assembly first dropped is fixed to the first vessel to surround the school of fish.

FIG. 1 illustrates such a state in which the school of fish is surrounded.

Both lengthwise ends of a net assembly 110 are fixed to the bow and the stern, respectively, of a first vessel 100. A net 113 of the net assembly 110 includes a set of a plurality of corks or floats 111 which float on the surface of seawater and form a float line through which a fiber rope passes, to be responsible for the buoyancy of the entire net assembly 110, a plurality of chains and weights 115 which are disposed in seawater to sink the net 113 into seawater and surround a school of fish, and a wire rope 116 which passes through and tightens connection rings to serve as a chain line closing the lower end of the net 113 and hauling the net 113.

The wire rope 116 is coupled to the net 113 by connection lines 114 below the weights 115. By pulling the wire rope 116 by a winch (not illustrated) provided in the first vessel 100, the lower end of the net 113 is closed to prevent fish from escaping.

In such a net assembly 110 used in the conventional art, the net 113 is formed to have a predetermined length and width by coupling a plurality of nets, having meshes with a size that can prevent fish from escaping, with one another up and down and left and right, depending on a target school of fish to capture.

As a material for forming each net, nylon has been used in the conventional art.

Since nylon has a higher elongation rate than other materials, it has an elasticity and a tensile strength required for a net. Also, since nylon is relatively cheap, it is used as a net for purse seine fishery.

However, because a nylon material is reduced in its strength and is deformed when exposed to ultraviolet rays, a problem may be caused in that it is necessary to frequently replace the net when the net is used for a long time in a sea area where strong ultraviolet rays are radiated. Also, since nylon contains a large amount of moisture when being wetted, there is a problem in that a significant towing force is required due to an increase in weight of the net when the net is hauled.

In addition, in the purse seine fishery, the net should be quickly sunken from the surface of seawater such that the lower end of the net quickly reaches more deeply than a depth at which fish drift, in the process of surrounding a school of fish by towing and deploying the net. However, because nylon has a specific gravity of about 1.14 and is not largely different from a specific gravity of seawater, there is a problem in that a weight having a considerable weight should be attached to the lower end of the net in order to quickly sink the net made of nylon into seawater.

DISCLOSURE

Technical Problem

Various embodiments are directed to a net assembly constructed to minimize the weight of the entire net assembly while allowing a net dropped and deployed into seawater in purse seine fishery to quickly sink from the surface of seawater.

Also, various embodiments are directed to a net assembly constructed to be used by being immersed into seawater under the harsh environment of the ocean and being capable of withstanding a high tensile strength and abrasion even when a net for purse seine fishery to which a large tensile strength and abrasion are applied is immersed into seawater.

Further, various embodiments are directed to a net assembly constructed to be capable of quickly capturing fish while minimizing damage to fish while capturing and pulling fish.

Technical Solution

In an embodiment, there is provided a net assembly used for purse seine fishery, mounted on a first vessel, dropped into seawater from an end thereof in a lengthwise direction from the first vessel, towed by a second vessel to surround a school of fish, and hauled to capture the school of fish.

The net assembly may include a plurality of floats floating on a surface of seawater to provide buoyancy to the net assembly, and coupled to one another in a spaced manner in the lengthwise direction of the net assembly; a net combination of a plurality of nets disposed under the floats in an inter-coupled state, and sunken and deployed from the surface of seawater to surround and capture fish; a weight body extending along a lower end of the net combination to provide a sinking force by means of gravity to sink the net combination; and a purse wire extending along the net combination while being spaced apart from the weight body in a downward direction, and tightened by the first vessel to allow the net assembly to form a closed space below the surface of seawater.

The net combination includes a fish capture part which forms an end of the net combination in the lengthwise direction, is first dropped into seawater, is towed by the second vessel and is hauled to capture the school of fish; a longitudinal end part which forms an end of the net combination opposite to the fish capture part in the lengthwise direction and is coupled to the first vessel; a body part which is disposed between the longitudinal end part and the fish capture part and forms a portion for surrounding fish; an upper end part which forms upper ends of the fish capture part, the body part and the longitudinal end part and is coupled to the floats; and a lower end part which forms lower ends of the fish capture part, the body part and the longitudinal end part and below which the weight body is coupled.

The fish capture part and the longitudinal end part are formed by combining a plurality of nets made of a nylon material, and the body part, the upper end part and the lower end part are formed by combining a plurality of nets made of a polyester or high-density polyethylene material having a specific gravity of 1.3 to 1.4.

In the construction of the disclosure described above, the respective parts of the net combination which surrounds and captures a school of fish are formed of nets made of different materials.

Nets which form the fish capture part and the longitudinal end part are made of a nylon material as in the conventional net assembly, and nets which form the other parts are made of a polyester or high-density polyethylene material.

Nylon has a density of 1.14 to 1.15 g/cm$^3$. A density of polyester or high-density polyethylene used in the disclosure varies with a material, but is generally in the range of 1.3 to 1.4 g/cm$^3$. Nylon exhibits an elongation rate of 20 to 30%, and polyester and high-density polyethylene exhibit an elongation rate of 7 to 18%.

Therefore, by forming the body part, required to be quickly sunken, using polyester or high-density polyethylene, the net assembly may be quickly sunken without increasing the weight of the weight body which is difficult to tow and haul.

Moreover, polyester and high-density polyethylene have tensile strengths larger than that of nylon. In particular, nylon has a tensile strength of 74 to 82% when being wetted, as compared to when being dried, but polyester and high-density polyethylene have no decrease in tensile strength.

Thus, by forming the body part which sinks into seawater and occupies a most area of the net assembly, with nets made of a polyester or high-density polyethylene material, the body part may exhibit a sufficient tensile strength even when the size of meshes is increased, and, by increasing the size of the meshes of the body part, friction with respect to seawater may be reduced and the body part may be more quickly sunken.

On the other hand, since the fish capture part is fixed to and towed by the second vessel which performs a towing operation and the longitudinal end part remains coupled to the first vessel while the net assembly is deployed and is dropped into seawater at a final stage of the net deployment to perform a function of surrounding a school of fish, the fish capture part and the longitudinal end part do not need to be quickly sunken and thus are formed using nets which are made of a nylon material.

Also, since the fish capture part and the longitudinal end part are subjected to a lot of impact caused by towing, by forming the fish capture part and the longitudinal end part using nets made of the nylon material which has a higher elongation rate than polyester or high-density polyethylene, the impact absorption capability of the fish capture part and the longitudinal end part may be enhanced.

Further, the upper end part is disposed on the surface of seawater and thus has a large amount of exposure to ultraviolet rays, and is applied with a considerable frictional force when the net assembly is dropped and hauled. The lower end part is applied with a large tensile force in the process of tightening the purse wire and hauling the net assembly. In the present disclosure, by forming nets, constructing the upper end part and the lower end part, using a high-density polyethylene or polyester material having a larger tensile strength and abrasion resistance than nylon, the tensile strength and abrasion resistance of the entire net assembly may be increased.

As described above, according to the present disclosure, by forming the fish capture part, the longitudinal end part and the remaining parts using nets made of different materials, the net assembly may be quickly sunken, and the tensile strength, the weather resistance and the abrasion resistance of the net assembly may be improved. By using no weight body having an excessively large weight, the net assembly may be easily hauled, towed and deployed.

On the other hand, in the net assembly according to the present disclosure, the nets which construct the fish capture part, the upper end part and the lower end part may be formed to have smaller meshes than the nets which construct the other parts of the net combination.

Since the fish capture part is a part which is towed and deployed by the second vessel, the fish capture part is not required to be quickly sunken. Since the fish capture part is a part where fish are gathered and captured when fish are surrounded and pulled, in the case where the fish capture part is formed to have large meshes, fish may escape from the net assembly through the fish capture part or may be damaged by being caught between meshes.

Therefore, by forming the fish capture part to have small meshes, it is possible to prevent an adverse influence on the sinking of the net assembly while preventing the escape of and damage to fish.

Further, since the upper end part is a part where fish are gathered, the upper end part is formed to have small meshes so as to provide a structure which prevents fish from escaping and being jammed between meshes and readily withstands a tensile force due to the coupling of the upper end part to the corks or floats. The lower end part may be formed to withstand the loads of the weights, in consideration of the coupling of the lower end part to the body part.

Furthermore, in the fish capture part, nets which construct an upper portion of a longitudinal end in the lengthwise direction may be formed of knotless nets.

When nets are formed by weaving fiber bundles which construct the nets, the knotless nets have no protrusions formed by knots where the fiber bundles are woven with one another, thereby decreasing resistance of seawater and causing no damage to fish.

When the net assembly is hauled, fish are densely gathered in the nets which construct the longitudinal end in the lengthwise direction, even in the fish capture part. In the present disclosure, by forming the nets constructing the longitudinal end in the lengthwise direction, as knotless nets, it is possible to quickly haul the net assembly and minimize damage to fish.

As an additional feature of the present disclosure, nets which construct the body part may be formed to have meshes with a size gradually increasing in a downward direction, and nets which are adjacent to the lower end part may be formed to have meshes with a size smaller than overlying nets.

The nets serve to allow seawater to pass therethrough and fish not to pass therethrough. In the net assembly according to the present disclosure, the body part is a part which functions to surround fish within a range encircled by the net assembly.

However, in the purse seine fishery, in the case of hauling the net assembly by gathering fish into the net assembly through tightening the purse wire, the fish are captured by being mainly gathered in the fish capture part, and the body part merely functions to surround fish when the net assembly is deployed.

Since fish tend to be reluctant to come into contact with a net, even when fish are surrounded by the net assembly, the fish do not attempt to escape from the net through meshes but act to avoid the net.

Thus, according to the above-described additional feature of the present disclosure, even when the meshes of the body part are formed to be larger than an average diameter of fish, the performance of surrounding fish does not deteriorate. In particular, in the case where a lower net is formed of a net having meshes with a larger size than an overlying net within which fish are mainly gathered, the fish are highly unlikely to escape therefrom.

However, a portion of the body part which is adjacent to the lower end part may be formed to have meshes with a small size so as to be easily coupled to the lower end part and support the load of the weight body.

In this way, even when the meshes of the body part are formed to have a size gradually increasing in the downward direction, there is no problem in the fish surrounding performance of a net. By increasing the size of the meshes, the resistance of seawater may be reduced, and thus, the net may be quickly sunken.

BRIEF DESCRIPTION OF DRAWINGS

FIG. 1 is a view illustrating a state in which a conventional net assembly having a construction generally known in the art is dropped into seawater and is deployed.

FIG. 2 is a development view of a net assembly in accordance with an embodiment of the present disclosure.

MODE FOR DISCLOSURE

Hereafter, the construction and operation of a net assembly in accordance with an embodiment of the present disclosure, as detailed contents for carrying out the present disclosure, will be described.

FIG. 2 is a development view of a net assembly in accordance with an embodiment of the present disclosure, and the net assembly according to the present embodiment is used for purse seine fishery for tunas.

The net assembly used for purse seine fishery for tunas is usually 2 to 3 km in length, and is disposed by sinking up to a depth of 300 m from the surface of seawater. Therefore, for the sake of convenience in illustration, in FIG. 2, the lengths and widths of nets which construct the net assembly are shown by being reduced, and the other components are illustrated to be relatively large.

Even in the net assembly according to the present embodiment, in such a similar way in a conventional net assembly, a plurality of floats 1, which float on the surface of seawater to provide buoyancy to the net assembly and extend in a lengthwise direction of the net assembly to be coupled to one another, are coupled to an upper rope 2 to be spaced apart from one another in a state in which they are arranged in the lengthwise direction. A net combination 10, which is formed by coupling a plurality of nets to one another and is sunken and deployed from the surface of seawater to surround and capture fish, is disposed under the floats 1 by being coupled to the upper rope 2.

A sinking chain 3, as a weight body which extends along the lower end of the net combination 10 and provides a sinking force by means of gravity to sink the net combination 10, is coupled to the net combination 10. A purse wire 4, which is pulled by a vessel to allow the net assembly to form a closed space below the surface of seawater, extends through rings 6 which are coupled to the lower end of the net combination 10 through connection lines 5, below the sinking chain 3.

The net combination 10 is sunken and deployed into the surface of seawater by the load of the sinking chain 3 and the dead weight of the nets constructing the net combination 10, and the upper end of the net combination 10 is positioned on the surface of seawater by the buoyancy of the floats 1.

The net assembly is mounted on a vessel (not illustrated), such as the first vessel 100 of FIG. 1, and then, one end of the net assembly in the lengthwise direction is towed, released and dropped into seawater by another vessel (not illustrated). The vessel which tows the net assembly rotates in a generally circular shape around a position of a school of fish so that the net combination 10 encircles and surrounds the school of fish.

The net combination 10 is formed by disposing in parallel and coupling a plurality of nets with one another up and down and left and right. The net combination 10 according to the present embodiment is constructed by nets made of two kinds of materials, and the nets are formed to have different mesh sizes, by using fibers with different thicknesses.

In FIG. 2, the net combination 10 is illustrated by being divided into regions according to functions of respective components.

In the net combination 10, one end (a right end in FIG. 2) in the lengthwise direction forms a fish capture part A and B where fish are surrounded, gathered and captured. The fish capture part A and B captures fish when the net assembly is hauled. In particular, in the fish capture part A and B, a longitudinal end part A forms a part where fish are finally gathered and pulled onto the vessel.

The fish capture part A and B is a part which is first dropped into seawater when the net assembly is dropped and deployed and is then towed by the vessel which performs a towing operation.

In the net combination 10, the other end (a left end in FIG. 2) in the lengthwise direction forms a longitudinal end part D which connects the net combination 10 to the vessel. The longitudinal end part D is a part which remains, when the net assembly is deployed, coupled to the vessel mounted with the net assembly, is dropped at a final stage of net deployment and performs the function of surrounding the school of fish.

A body part C extends between the fish capture part A and B and the longitudinal end part D, and occupies a most area of the net combination 10. The body part C is a part which performs the function of surrounding fish.

An upper end part E and a lower end part F which form the upper ends and the lower ends of the fish capture part A and B, the body part C and the longitudinal end part D are parts to which the floats 1 and the sinking chain 3 are coupled, respectively.

In the present embodiment, nets which construct the fish capture part A and B and the longitudinal end part D are nets which are formed of fibers made of a nylon material.

The nets made of the nylon material are formed using fibers with various thicknesses to have various mesh sizes. The fibers having a thickness range of 2.2 to 4.2 mm are selectively used.

Since the fish capture part A and B are parts for confining, gathering and lifting up tunas, the fish capture part A and B is formed to have meshes with a small size that prevents the bodies of tunas from escaping and the heads of the tunas from being jammed between the meshes.

Since the longitudinal end A of the fish capture part A and B is a part where tunas are gathered and pulled up when the net assembly is hauled, the longitudinal end A is formed to have a mesh size of 3.5 inches, and is formed using a knotless net unlike the net generally used in the art.

Unlike a knotted net in which knots are formed by weaving fibers at the intersections of the fibers constructing the net, the knotless net is formed by crossing fibers at the intersections of the fibers, applying heat to the intersections and thereby joining the fibers.

By using such a knotless net at the longitudinal end A of the fish capture part A and B, it is possible to prevent the bodies of tunas from being damaged by the knots of the knotted net when pulling up the tunas.

In the fish capture part A and B, the part B which is adjacent to the body part C is a part where tunas are gathered when the net assembly surrounds tunas and the purse wire 4 is tightened to close the open lower end of the net assembly and narrow an inner space of the net assembly. In the part B, since tunas seek to escape from the net while colliding therewith, the part B is formed to have meshes with a small size of 4.5 inches, so as to prevent tunas from escaping therefrom and the bodies of tunas from being jammed between the meshes.

The fish capture part A and B are parts which are towed by the vessel when the net assembly is dropped and deployed. Therefore, an impact load caused by the towing is applied to the fish capture part A and B.

By forming the fish capture part A and B with a net made of a nylon fiber material, the net made of the nylon material which has a higher elongation rate than other materials relieves the impact load.

Nets which construct the longitudinal end part D are formed using fibers with thicknesses of 3.5 mm and 4.2 mm to have a mesh size of 5 or 8 inches.

Next, nets which construct the body part C, the upper end part E and the lower end part F are formed of nets which are woven using high-density polyester fibers.

The density of a polyester material varies with a product, and a polyester material with a specific gravity of 1.38 is used in the present embodiment.

The polyester material which constructs the nets according to the present embodiment has a higher density than nets made of a nylon material used according to the conventional art. Since the nylon material has a small difference in specific gravity from seawater, a net made of the nylon material hardly sinks in a high-wave environment, and therefore, a weight body having a considerable weight should be suspended from the net so as to sink the net. However, in the present embodiment, by constructing the nets of the body part C which occupies a most area, with a polyester material, the body part C may be sunken even by the dead weight of the net, and the sinking may be accelerated by the sinking chain 4 which has a simple construction as a sinking weight body.

In the present embodiment, while polyester is used as materials of the nets which construct the body part C, the upper end part E and the lower end part F, the same performance and effects may be obtained even when high-density polyethylene is used.

In the conventional art, the body part C is also formed using nets which have the same mesh size as the fish capture part A and B so as to prevent the escape of tunas. However, by considering the fact that most fish including tunas tend to avoid a net which comes within the field of vision, unless they are densely gathered, the nets which construct the body part C are formed using nets which have mesh sizes of 8, 10 and 12 inches.

In the case where, in this way, the body part C is formed to have a large mesh size, since the body part C may be applied with a smaller frictional force by seawater than a net with a small mesh size, that is, a densely woven net, the net may be quickly sunken.

On the other hand, sizes of the meshes of the nets which construct the body part C are increased from an upper end toward a lower end. By disposing the nets having the mesh sizes of 8, 10 and 12 inches sequentially from the upper end, the meshes of lower nets have large sizes to facilitate the sinking of the nets.

The upper end part E and the lower end part F which form the upper ends and the lower ends of the fish capture part A and B, the body part C and the longitudinal end part D are parts to which the floats 1 and the sinking chain 3 are coupled, respectively, and to which large tensile forces are applied.

Therefore, the upper end part E and the lower end part F are formed using nets which are made of a polyester material having a larger tensile strength and abrasion resistance compared to nylon and having a small decrease in tensile strength even when being wetted, but the nets are formed to have a small mesh size of 5 inches so as to have a high tensile strength as a whole and the thicknesses of fibers constructing the respective nets are used as 4.6 mm and 5.0 mm, respectively.

While the construction and operation of the net assembly in accordance with one embodiment of the disclosure have been described above, the disclosure is not limited to the embodiment, and various modifications, changes and additions of components may be made within the scope of the claims.

The invention claimed is:

1. A net assembly used for purse seine fishery, which is mounted on a first vessel, dropped into seawater from the first vessel, and towed by a second vessel to surround and pull fish to capture fish, the net assembly comprising:
   a plurality of floats floating on a surface of seawater to provide buoyancy to the net assembly, and coupled to one another in a spaced manner in a lengthwise direction of the net assembly;
   a net combination of a plurality of nets disposed under the floats in an inter-coupled state, and sunken and deployed from the surface of seawater to surround and capture fish;
   a weight body extending along a lower end of the net combination to provide a sinking force by means of gravity to sink the net combination; and
   a purse wire extending along the net combination while being spaced apart from the weight body in a downward direction, and tightened by the first vessel to allow the net assembly to form a closed space below the surface of seawater, the net combination including a fish capture part which forms a longitudinal end of the net combination in the lengthwise direction, is first dropped into seawater, is towed by the second vessel and is hauled to capture a school of fish; a longitudinal end part which forms an end of the net combination opposite to the fish capture part in the lengthwise direction and is coupled to the first vessel; a body part which is disposed between the longitudinal end part and the fish capture part and forms a portion for surrounding fish; an upper end part which forms upper ends of the fish capture part, the body part and the longitudinal end part and is coupled to the floats; and a lower end part which forms lower ends of the fish capture part, the body part and the longitudinal end part and below which the weight body is coupled, wherein the fish capture part and the longitudinal end part are formed by combining the plurality of nets made of a nylon material, and wherein the body part, the upper end part and the lower end part are formed by combining the plurality of nets made of a polyester or high-density polyethylene material having a specific gravity of 1.3 to 1.4.

2. The net assembly according to claim 1, wherein the plurality of nets which construct the fish capture part, the upper end part and the lower end part are formed to have smaller meshes than the plurality of nets which construct the longitudinal end part and the body part.

3. The net assembly according to claim 2, wherein, in the fish capture part, the plurality of nets which construct an upper portion of the longitudinal end in the lengthwise direction are formed of knotless nets.

4. The net assembly according to claim 2, wherein the plurality of nets which construct the body part are formed to have meshes with a size gradually increasing in a downward direction, and the plurality of nets which are adjacent to the lower end part are formed to have meshes with a size smaller than the plurality of nets positioned above them.

* * * * *